Figure 7:
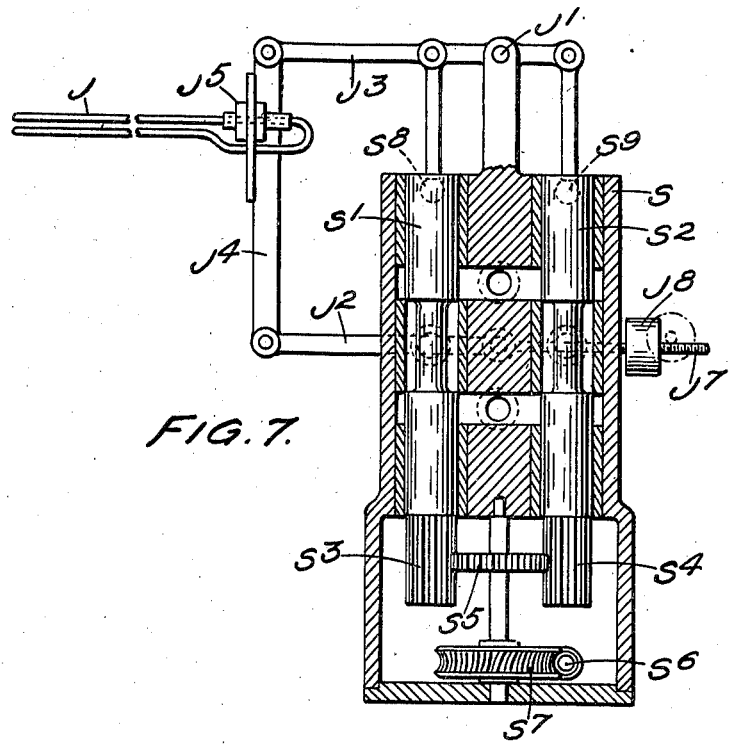

April 7, 1936.  J. P. BROWN  2,036,914
GYROSCOPIC APPARATUS
Filed Sept. 27, 1934  3 Sheets-Sheet 1
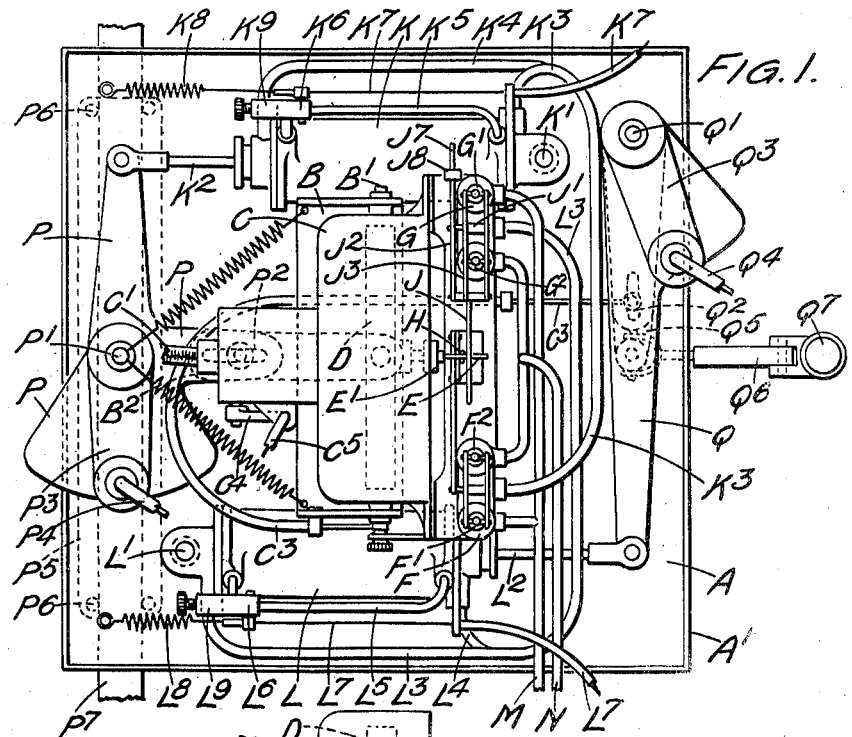
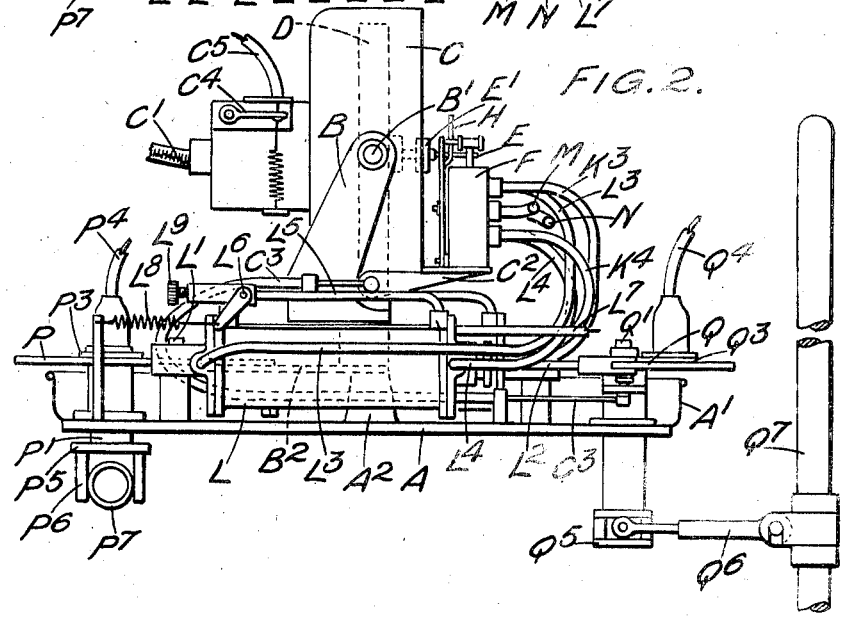
Inventor,
J. P. Brown.
Per,
Blair Kilcoyne Attys

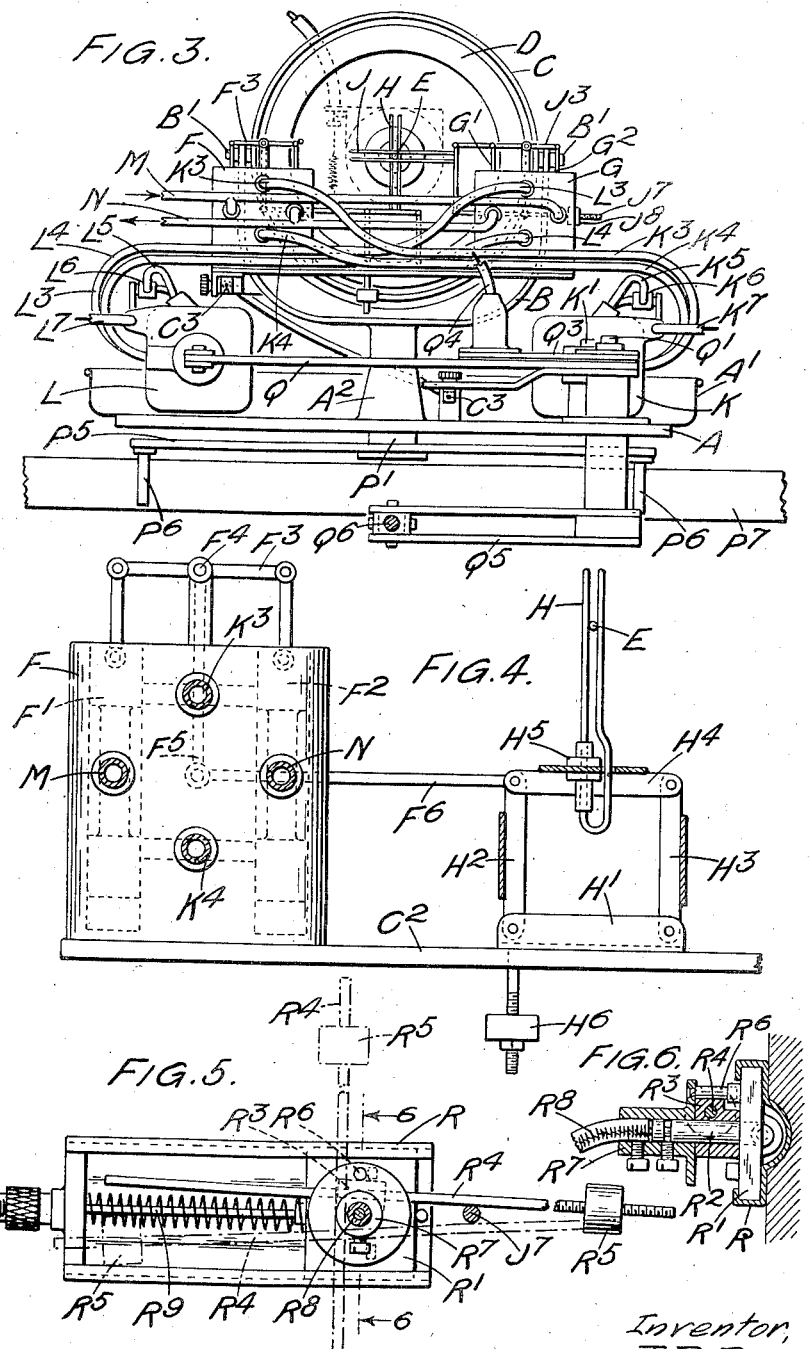

April 7, 1936.        J. P. BROWN         2,036,914
GYROSCOPIC APPARATUS
Filed Sept. 27, 1934       3 Sheets-Sheet 3

Inventor,
J. P. BROWN.

Patented Apr. 7, 1936

2,036,914

UNITED STATES PATENT OFFICE 2,036,914

GYROSCOPIC APPARATUS

John Pollock Brown, South Croydon, England, assignor to P. B. Deviator Limited, London, England, a company of Great Britain Application September 27, 1934, Serial No. 745,794
In Great Britain October 24, 1933

29 Claims. (Cl. 244—29)

This invention relates to gyroscopic apparatus, for example for air and other craft, and one object of the invention is to provide a small, light-weight, robust and reliable form of apparatus for the automatic navigation of air and other craft which will maintain its accuracy of direction without hunting.

The type of gyroscopic mechanism, referred to herein as the type specified, to which the present invention relates, is that in which the rotor is mounted on and driven by a rotating driving spindle by means of a ball joint between the surfaces of which slip is caused to occur in the direction of rotation. It will be appreciated that the term "ball joint" is intended to cover joints in which there is no actual ball but only part-spherical surfaces.

One example of mechanism of the type specified occurs in the present applicant's prior U. S. Patent Specification No. 1,860,230 which described a form of deviation indicator for indicating deviation of a craft from its course. In that form, when the craft, and with it the rotor spindle, deviates angularly from its course the rotor axis momentarily does not follow such deviation and thus moves relatively to the craft and indicates the change of direction of the latter. Means such as vanes are provided to retard the rotor so that there is continuous slip between the surfaces of the ball joint and thus little resistance to relative movement about axes perpendicular to the spindle.

In such apparatus, when the spindle shifts angularly so that its axis no longer coincides with that of the rotor, a small component of the friction produces a couple tending to cause precession of the gyro rotor into realignment with the spindle. Thus if the spindle changes its orientation in space the rotor will tend to follow it and thus also change its orientation in space.

In applying the present invention, which seeks to overcome this tendency, means are provided for imparting to the spindle a follow-up movement relatively to the craft so that the moment the rotor axis shifts relatively to the craft the spindle is given a corresponding movement to bring it back into alignment with the rotor.

This follow-up movement may be effected about one axis perpendicular to that of the spindle, or it may be effected about two mutually perpendicular axes both perpendicular to the axis of the spindle. Such axes are referred to herein as the "axes of control".

Thus the present invention comprises, in gyroscopic apparatus, the combination with gyroscope mechanism of the type specified, of servo means actuated by movement of the rotor axis relative to the spindle about an axis of control at right angles to the spindle axis, and serving to impart to the spindle a follow-up movement relatively to its support about that axis of control to bring the spindle axis again into a plane containing the rotor axis and the said axis of control.

In one form the invention may comprise, in gyroscopic apparatus, the combination with gyroscope mechanism of the type specified, of a servo device actuated by movement of the rotor relative to the spindle about each of two mutually perpendicular control axes each at right angles to the spindle axis, each servo device serving to impart to the spindle a follow-up movement relatively to its support about the respective axis of control to bring the spindle axis again into a plane containing the rotor axis and the said axis of control, the two servo devices thereby together bringing the spindle axis into alignment with the rotor axis.

In one application of the invention for air or other craft the servo means is also adapted to operate navigating controls effecting the navigation of the craft about the axis of control of each such axis.

Automatic navigating apparatus has previously been employed in which the control is by means of a "free gyro" rotor, that is to say a rotor mounted so as to be as free to tilt relatively to the craft as is practically and commercially possible. Such a mounting involves delicate pivots which are difficult to maintain in good repair since the tilting of the gimbals in which the gyro is mounted has to take place without shifting the orientation of the gyro in space. Thus any small frictional couples at the pivots will tend to cause precession of the gyro and introduce errors in all directions which cannot be estimated or allowed for.

In the present construction, on the other hand, any slight error that may occur owing to the friction of the ball joint is always in the direction in which the deviation occurred and may therefore to a large extent be compensated for. The mounting of the frames in which the gyro spindle is supported moreover does not need to be delicate since the tilting movement of the gyro spindle is under the control of servo mechanism which may be made as powerful as may be required.

If the rotor ball mounting be made truly spherical and of a suitable fit to accommodate suitable lubricant without slop between the surfaces, which would permit of a change of balance, the time taken for the rotor to move into line with the spindle may then be made considerable and the error thereby reduced.

Thus in one example, in which the speed of the spindle and rotor are respectively 3240 R. P. M. and 1670 R. P. M., the time taken for the rotor to realign itself from a deviation of 5° has been found to be 120 seconds. From a deviation of 1° the time taken was 60 seconds. This was with a 5-inch diameter rotor of which the rim weighed 1 pound and the total weight was about 1½ pounds, mounted on a ½-inch diameter ball joint.

The servo mechanism on the other hand may take less than a second to realign the spindle with the rotor so that when a deviation occurs the spindle is brought back into realignment before the rotor has had time to move appreciably.

Thus with a rudder controlled by apparatus in accordance with the invention it was found that after flying several hundred miles without adjustment no substantial deviation of the gyro from its initial orientation had occurred.

Figure 8:
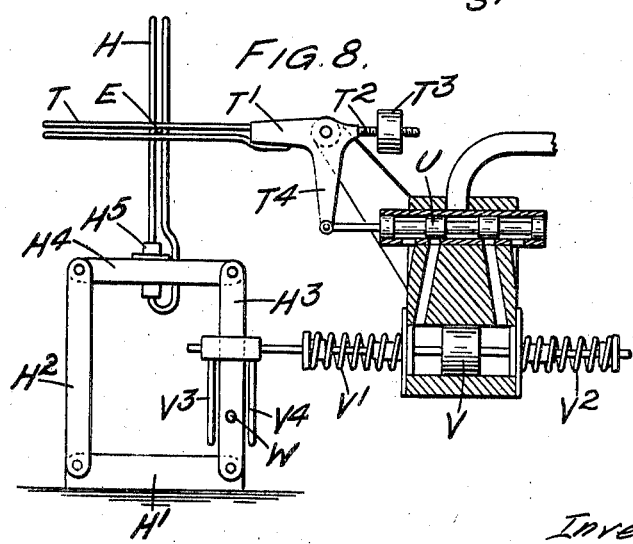

Further features of the invention will be appreciated from the following description of a specific embodiment of the invention and certain modifications thereof with reference to the accompanying drawings, in which Figure 1 is a plan view of a gyroscopic device for controlling both the rudder and elevator of an air craft, Figure 2 is a side elevation of the device, Figure 3 is an end elevation of the device, Figure 4 is an enlarged elevation of one of the servo valves and its operating linkage as seen in Figure 3, Figure 5 is an elevation of an attachment for causing precession of the gyro rotor, Figure 6 is a section on the line 6—6 of Figure 5, Figure 7 is a sectional elevation of a modified form of servo valve and its operating linkage, and Figure 8 is an elevation partly in section of an auxiliary servo device intended to be incorporated in the apparatus when only one navigating control is to be operated.

In the preferred example shown in Figures 1–3, the device is arranged to operate navigating controls about each of two mutually perpendicular axes of control and the gyro spindle is made to follow the rotor about both of these axes. In a simplified arrangement the device may be arranged to operate navigating controls about one axis only, the spindle being made to follow the rotor about that axis while the rotor is made to follow the spindle about an axis perpendicular thereto by means of the arrangement shown in Figure 8.

In the latter case the device may be employed to operate any one navigating control for example it may operate the rudder of an air craft. Similarly in the more complete construction shown in Figures 1–3 the device may be employed to operate any two navigating controls for example the rudder and elevators or the rudder and ailerons or the elevators and ailerons of an air craft.

In each case the device must be disposed in the correct orientation for the particular controls to be operated.

The particular construction shown in Figures 1–3 is designed to operate the rudder and elevators of an air craft to maintain the craft in a definite direction and attitude, and to be mounted with the rotor axis in the fore and aft direction.

As shown in Figures 1–3 the apparatus is carried by a base plate A having an upturned edge $A^1$ forming a tray by which any oil discharged from the apparatus can be caught and returned through suitable filters to a reservoir. The base plate carries a vertical pillar $A^2$ by means of which a cradle B is carried so as to be capable of swinging about a vertical axis of control.

The cradle B carries bearings $B^1$ by which the gyro casing C is carried so as to be capable of tilting about a horizontal axis athwart the craft.

The gyro casing C has at its forward end bearings for a horizontal spindle (not shown). The spindle may either be driven through gearing by means of a flexible drive $C^1$ from a small windmill or other convenient driving means or the forward part of the casing may contain a small oil turbine and the part $C^1$ may represent a flexible pipe by which oil from an oil pressure supply is delivered to drive the turbine. Alternatively other means may be provided for maintaining rotation of the spindle.

The spindle has a spherical end of which the centre of curvature lies on the axis of rotation and also on the axis of the horizontal bearings $B^1$ and also on the axis of the vertical pivot $A^2$. Mounted on the spherical end of the spindle is the gyro rotor D the hub of which is formed with one or more part-spherical surfaces which cooperate with the ball-shaped end of the spindle to form a ball joint. Thus the gyro rotor can tilt relatively to the spindle about axes at right angles to it.

The gyro rotor may be built up from a heavy rim, a hub, a flat annulus which is fixed to the hub, and a number of vanes which, besides locking the parts together, serve to retard rotation of the rotor and cause slip between the surfaces of the ball joint for the purposes set out in prior U. S. Patent Specification No. 1,860,230. The construction and arrangement of the rotor may for example be as described in that specification or again the arrangement may be as described in U. S. Patent Specification Serial No. 704,541.

From the side of the rotor remote from the spindle (i. e. that facing the tail of the air craft) a pin E extends along the axis of the rotor. On this pin is a weight $E^1$ which can be adjusted axially by screwing it to adjust the balance of the rotor.

Fixed to the rotor casing C is a plate $C^2$ carrying two sets of servo operating valves F and G for controlling the rudder and elevator respectively. The valve assembly F is shown clearly in Figure 4 from which it will be seen that it has two valves $F^1$ and $F^2$ of the piston type which are mounted in a single casing with their axes vertical. The valves are connected to opposite ends of a centrally pivoted lever $F^3$ so as to be balanced. The pivot $F^4$ of the lever carries a downwardly extending arm $F^5$ by means of which the valves are operated.

The use of parallel valves in a single casing enables a convenient and compact port arrangement to be adopted for admitting pressure liquid to one end of a double-acting piston while connecting the other end to a relief passage or vice versa.

For the purpose of operating the valve F a small fork H is provided mounted vertically on a parallel linkage, with one limb on each side of the axial pin E of the rotor.

The bottom link $H^1$ of the linkage is mounted on the valve base plate $C^2$ and the side links $H^2$ and $H^3$ are pivoted to it so that the top link $H^4$ can move longitudinally while remaining horizontal. The fork H is mounted on the link $H^4$ in a bearing $H^5$ enabling it to rotate about an axis parallel to its length. The connection between the fork H and the valve assembly F is completed by a link $F^6$ connecting the parallel linkage to the arm $F^5$. The side link $H^2$ of the parallel linkage is extended downwardly through the valve base plate $C^2$ and provided with a counterweight $H^6$ to balance the weight of the linkage and fork H.

If the rotor turns about a vertical axis relatively to its casing the fork H will be moved horizontally, the lever $F^3$ carrying the valves will be rocked about its pivot $F^4$ and one valve will be raised while the other will be lowered.

The limbs of the fork are so spaced as to bear lightly on both sides of the pin. Although the member is described as a fork it is to be understood that it is not necessarily open at one end but may be merely a slotted bar. It is, however, preferred that the fork should be somewhat resilient so as to press with a uniform light pressure on both sides of the pin. In the particular arrangement employed the fork is of springy wire. The turning of the fork about an axis parallel to its length in the bearing $H^5$ prevents the pin E from being jammed between its limbs. The pin E may, if desired, be very slightly out of alignment with the rotor axis so as to keep the fork H continuously shivering or slightly reciprocating and so prevent sticking.

The valve assembly G for the elevator control is provided with a fork J similar to the fork H but mounted horizontally. This fork is similarly carried in a bearing $J^5$ secured to a link $J^4$ mounted so as to be capable of moving longitudinally while remaining vertical on a pair of links $J^2$ and $J^3$. These are pivoted respectively to the valve casing itself and to an arm $J^1$ extending upwardly therefrom.

This linkage is shown clearly in Figure 7 as applied to a modified form of valve which will be described hereafter. In the arrangement shown in Figures 1–3 the valve assembly G is similar to the valve assembly F and comprises a pair of vertical piston valves $G^1$ and $G^2$. In this case, however, the piston rods of the valves are pivoted directly to the link $J^3$. The link $J^2$ is provided with an extension $J^7$ carrying a counterweight $J^8$ to balance the weight of the linkage and the fork J.

Each of the servo valve assemblies F and G serves to control the admission of oil under pressure to one of a pair of servo motors K and L serving to operate the rudder and elevator controls respectively. In order that the flexible pipes connecting the valves to their servo motors shall not restrict the movement of the rotor casing and shall not be subjected to undue bending the valve assembly F on the left of the craft is connected to the servo motor K on the right of the craft, while the assembly G on the right of the craft is connected to the servo motor L on the left of the craft. The pipes are shown diagrammatically and in practice may be longer than is indicated in the drawings.

Each servo motor comprises a cylinder containing a double-acting piston. The cylinder K is pivoted at its rear end to the base plate at $K^1$ while the piston rod $K^2$ projects at its forward end. The arrangement of the valves will be seen clearly from Figure 4 from which it will be clear that the valve assembly F has four pipe connections. As shown in Figure 3 the outside valve cylinder communicates through a pipe M with a source of liquid under pressure while the inside cylinder communicates through a relief pipe N with a reservoir for the liquid. It is found that when a liquid such as oil is employed to operate the servo mechanism rapid and positive movement is obtained without hunting. The source of liquid under pressure may, for example, be a pressure tank into which the liquid is forced by a rotary pump driven by the engine or a small windmill from the relief tank. The upper port communicates through a pipe $K^3$ with the rear end of the servo cylinder while the lower port communicates through a pipe $K^4$ with the forward end of the servo cylinder.

Thus if in Figure 3 or 4 the fork H is moved to the left the pressure supply M will be put into communication with the pipe $K^3$ and the piston rod $K^2$ will be projected from the cylinder, that is to say moved forwardly of the air craft.

As shown in Figure 1 the piston rod $K^2$ is connected to a bell crank P pivoted to the base plate A about a central vertical pivot $P^1$. The bell crank has two arms and a fan-shaped extension. The rearwardly projecting arm of the bell crank P is provided with a slot $P^2$ lying over a corresponding slot in an arm $B^2$ secured to the cradle B. One of these slots carries a pin which projects into the other. Consequently when the bell crank P is swung by means of the servo motor, the cradle B is also swung about a vertical axis. If for example as previously supposed the fork H is moved to the left in Figures 3 and 4 putting the source of pressure into communication with the pipe $K^3$ and projecting the piston rod $K^2$ from the cylinder K, the bell crank P will be swung in an anti-clockwise direction as seen in Figure 1 and the cradle B in a clockwise direction. The movement of the fork H contemplated corresponds to movement of the rotor in a clockwise direction in Figure 1 and hence the cradle has been made to follow the movement of the rotor.

The ratio of movement of the cradle to that of the bell crank can be adjusted by shifting the pin along the slot and clamping it in a different position. Moreover the relationship between the movements can also be slightly altered by fixing the pin to the arm $B^2$ instead of to the bell crank. The movement of the cradle, and with it the casing of the valve F and the support of the linkage carrying the fork H, will continue until the fork H is again in its central position with respect to the valves, that is to say the rotor spindle is in line with the pin E.

In addition to imparting a follow-up movement to the rotor spindle in accordance with the invention, the servo-motor in the present arrangement operates a navigating control as stated above. For this purpose the pivot $P^1$ carries an arm $P^3$ extending over the fan-shaped extension of the bell crank and carrying a pin which normally projects into a hole in the fan-shaped extension. This pin can be withdrawn by means of a Bowden wire $P^4$ if it should be desired, for example in an emergency, to throw the gyroscope apparatus out of action and operate the controls manually. The pivot $P^1$ extends through the base plate and at its lower end carries a plate $P^5$ having four downwardly projecting pins $P^6$ which engage opposite sides of the rudder bar $P^7$ of the craft. Thus it is only necessary to drop the apparatus into the correct position to engage directly with the portion of the rudder bar between the foot rests.

Since the cradle will always continue to move until the fork H is in its middle position and the valves are closed, that is to say it will move an amount equal to the movement of the rotor relative to the craft, it will be appreciated that by moving the pin along the slot $P^2$ the amount of rudder applied for a given deviation of the craft can be varied.

From the foregoing description it will be appreciated that if the aircraft turns about a vertical axis the gyro rotor, remaining for the moment where it is, will shift the fork H laterally, relative to the craft, and operate the servo valves so that the cradle and with it the servo valves and spindle of the gyro will turn until the fork is restored to its normal position. In this manner the spindle is brought again promptly into line with the rotor axis and there is no tendency for the latter to shift.

The operation of the elevator controls is similar in principle to that of the rudder. Thus the valve assembly G has four pipe connections of which the outer and inner valve cylinders are connected respectively to the pressure supply M and relief pipe N while the upper and lower ports are connected respectively to pipes $L^3$ and $L^4$ leading to the forward and rearward ends respectively of the servo cylinder L. The latter is pivoted at its forward end at $L^1$ and has its piston rod $L^2$ extending rearwardly, that is to say towards the pilot. The piston rod $L^2$ is connected to the longer arm Q of a double-lever of which the shorter arm, situated beneath the longer arm, as shown in Figure 3, is provided with a slot $Q^2$. The lever is pivoted at $Q^1$. The slot has in it an adjustable ratio pin anchorage to which is secured one end of a plain suitably flexible push and pull wire $C^3$ whose other end is anchored to a similar pin in the valve base plate $C^2$. This wire is housed in a close fitting flexible casing $C^4$ whose one end is anchored to a swivelling pin on the base plate A and the other end similarly anchored to the cradle B. Consequently when the lever Q turns about the pivot $Q^1$ the wire tilts the gyro casing and valve assembly about the horizontal axis of the trunnions $B^1$.

The pivot $Q^1$ carries an arm $Q^3$ having a pin controlled by a Bowden wire $Q^4$ and arranged so as to project into a hole in a fan-shaped extension of the arm Q. The pivot $Q^1$ projects down through the base plate and at its lower end carries an arm $Q^5$ which is connected by universal joints and a link $Q^6$ to the control column or joy stick $Q^7$ of the aircraft. The end of this link $Q^6$ next to the stick is made in the form of an open eye so as to be capable of disconnection from the stick when desired, as for instance when "taking off" an aircraft when under automatic rudder control.

Thus if, for example, the axial pin E of the rotor drops downwardly relative to the craft placing the source of supply in communication with the pipe $L^3$ and projecting the piston rod $L^2$ from its cylinder, the lever Q will be moved in an anti-clockwise direction as seen in Figure 1, the wire $C^3$ will be pulled and the gyro casing C will be moved in a clockwise direction as seen in Figure 2. The movement contemplated was a clockwise movement of the gyro rotor as seen in Figure 2 and hence the device serves to impart a follow-up movement to the casing and spindle of the rotor. As in the case of the rudder control this movement will continue until the valves are restored to their central position and hence the amount of elevator applied for a given deviation can be adjusted by shifting the end of the wire $C^3$ along the slot $Q^2$.

In order to enable the course to be definitely altered, means is provided for shifting the rotor into, and maintaining it in line with the spindle and for throwing the servo mechanism out of operation so that the new course may be set manually. For this purpose each servo motor is provided with a valve and passages by which the two ends of the cylinder can be placed in communication at will. Thus the cylinder K is provided with a pipe $K^5$ and a valve $K^6$ operated by a Bowden wire $K^7$ against a spring $K^8$ while the cylinder L is provided with a pipe $L^5$ and a valve $L^6$ operated by a Bowden wire $L^7$ against a spring $L^8$. The parts $K^9$ and $L^9$ associated with the valves $K^6$ and $L^6$ are simply venting cocks for allowing air to escape from the servo systems. When the Bowden wires $K^7$ and $L^7$ are operated, the valves $K^6$ and $L^6$ are opened and opposite ends of the cylinders K and L are placed in communication so that the controls can be operated manually. By this means the pilot is enabled to turn the craft to the direction and attitude in which he wishes to fly.

While doing this it is necessary for the rotor to be brought into and kept in line with its spindle. For this purpose means is provided for increasing the friction between the surfaces of the ball joint. When the axis of rotation of the rotor and the spindle are not in alignment, any frictional couple between them has a component tending to produce precession of the rotor into line with the spindle. In the prior U. S. Patent Specification No. 1,860,230 referred to above, means is described for increasing the friction by means of a pin extending through an axial bore in the rotor spindle through the end thereof and pressing upon the inner surface of the rotor hub. Such a pin is provided in the example shown in the drawings and may be operated for changing course to bring the rotor rapidly into line with the spindle and hold it in line as the spindle moves.

The device is not visible in the drawings but is controlled by means of an arm $C^4$ by a Bowden wire $C^5$ attached to the rotor casing C. On operating the Bowden wire $C^5$ the pin is projected into resilient contact with the spherical surface of the hub of the rotor. This spherical surface preferably has in it a shallow bore into which the end of the pin can drop freely when the rotor and spindle are in line. In this way the rotor and spindle are positively held in line without exerting an axial force on the spindle, a particularly desirable feature when the spindle is driven by means of a turbine.

Conveniently the Bowden wire $C^5$ and the Bowden wires $K^7$ and $L^7$ are all connected to a single operating lever so that it is only necessary to pull this lever before changing course. When the new course has been set, the lever is released or returned to its normal position, thereby closing the valves $K^6$ and $L^6$ and withdrawing the pin along the rotor spindle so that any follow-up of the rotor into line with the spindle will then be relatively slow compared with the servo action in causing the spindle to follow the rotor and thus the orientation of the rotor can remain substantially constant.

In order to make a slight correction to the direction of movement of the aircraft without disconnecting the automatic navigating apparatus, the valve casings of the servo mechanism may be movably mounted with respect to the rotor casing or vice versa. For example, the valve casings may be pivoted at the bottom about horizontal axes so that they can be moved to shift the valves, for example, by means of a cam operated by a Bowden wire or the like and acting on part of the valve casings.

It is, however, preferred to construct the valve casings as a rigid unit firmly secured to the rotor casing. In this case an adjustment to the course or attitude of the craft may be effected by causing precession of the gyro rotor about the axis or axes of control.

This adjusting means or that referred to in the previous paragraph may be operated by hand or by some external automatic mechanism. For example, it may be operated by a compass of known type such as a "Holmes tele compass" or electric, electro-magnetic or radio-electric means such as those used to detect divergence from a wireless beam or director cable. Or again, the elevator control may be governed by a manometric pressure device. It will be appreciated that a combination of such devices may be employed and they may operate either direct or through servo mechanism.

Figures 5 and 6 show such a device for causing precession of the rotor about a vertical axis. The device is mounted on the face of the valve casing G seen at the right in Figure 3 and operates by pressing upwardly or downwardly on the pin $J^7$ which is an extension of the arm $J^2$ of the parallel linkage by which the fork J is carried. Thus downward pressure on the pin $J^7$ will press the axial pin of the rotor upwardly while upward pressure will press it downwardly. As shown in Figures 5 and 6, the device for causing precession comprises a fixed guide R within which a rectangular slide $R^1$ is mounted to slide longitudinally. A spindle $R^2$ projects from the face of the slide and carries a boss $R^3$ through which passes a rod $R^4$ carrying a weight $R^5$ near one end. The boss $R^3$ has a flat at the top (as seen in Figures 5 and 6) over which extends a pin $R^6$ carried by a sleeve $R^7$ also mounted on the spindle $R^2$. The sleeve $R^7$ has a flexible shaft $R^8$ secured to it.

In the position shown in full lines in Figure 1, the rod $R^4$ bears by gravity on the top of the pin $J^7$ and hence tends to cause precession of the rotor in one direction. If the flexible shaft $R^8$ is turned through a right angle in an anti-clockwise direction as seen in Figure 5, the rod $R^4$ is lifted off the pin J into a substantially vertical position while a further rotation through a right angle brings the opposite end of the rod $R^4$ into a position in which it presses upwardly on the pin $J^7$ and causes precession of the rotor in the opposite direction. These two positions of the rod $R^4$ are shown in dotted lines. The pin $R^6$ operates against stops on the slide $R^1$ and only engages the flat on $R^3$ loosely to permit of a gravity pressure on the pin $J^7$ within reasonable limits of its movement.

In order to vary the rate of precession, the slide $R^1$ is provided with a Bowden wire control $R^9$ by which it can be shifted along the guide R. Thus when it is in the position shown, the weight $R^5$ operates with a considerable mechanical advantage so that a substantial pressure is exerted on the pin $J^7$. When the slide $R^1$ is moved to the left in Figure 5, the mechanical advantage is reduced.

The device shown in Figures 5 and 6 may be used intermittently for effecting adjustments to the course of the craft or it may be used continuously for flying in circles when it is desired to remain for a time in a certain locality. Thus, for example, if an aerodrome is unprepared for the landing of an aircraft, the pilot can simply operate the device shown in Figures 5 and 6, after which the craft will continue to fly in circles on substantially the same course, passing over the aerodrome repeatedly until the moment arrives for landing.

It will be appreciated that it is essential to reduce to a very low value the resistance to movement of the servo valves so as to keep down the resistance to lateral movement of the forks H and J and avoid causing undesired precession of the gyro rotor. For this purpose, the valves may be made a comparatively easy fit in their casing in order to reduce resistance to their movement and to get rid of foreign matter which might cause sticking. A certain leakage of oil is unimportant if not actually advisable to ensure no ingress of grit from the atmosphere, since any oil that leaks is collected in the tray $A^1$ and returned to the relief tank through a suitable filter. With the valves shown in Figures 1–4, a very light oil has been employed and has given satisfactory results.

In some cases, however, it may be desirable to employ a comparatively heavy oil for operating the servo mechanism. For example, oil under pressure may be derived from the lubricating system of the engine of the aircraft thus eliminating any special pump. In these circumstances, it is desirable to reduce still further the resistance to movement of the valves by rotating them continuously. Thus Figure 7 shows an arrangement in which, instead of the valves G, a modified form of valve assembly S is employed. In this case each of the piston valves $S^1$ and $S^2$ is formed at its lower end with gear teeth $S^3$ and $S^4$ and both sets of teeth mesh with those of a driving pinion $S^5$ driven through a worm $S^6$ and worm wheel $S^7$ by means of a flexible drive or by employing a small turbine in place of the worm wheel. Owing to the fact that the valves are rotating, the frictional resistance to longitudinal movement between them and the walls of their casing is reduced, while owing to the fact that slip occurs between gear teeth, the frictional resistance to their longitudinal movement, between them and the driving pinion $S^5$, is also low. The piston valves may be connected to their operating levers in any convenient manner, enabling them to rotate, for example by piston rods with ball-shaped ends $S^8$ and $S^9$ in the piston heads.

In the arrangement shown in Figures 1, 2 and 3, provision is made for operating both the elevator and rudder controls, and hence the spindle is made to align itself with the axis of the rotor about axes both vertical and athwart the craft. In some cases, however, for the sake of simplicity or cheapness, it may be sufficient and desirable to employ an arrangement in which the control is about one axis only. For example, only the rudder may be controlled. In this case it is desirable that the movement of the gyro rotor relative to the spindle about a horizontal transverse axis should not be excessive and for this reason means will be provided to cause precession of the gyro rotor so that it follows the spindle if the latter tilts about such a horizontal axis.

In such an arrangement the valve assembly G and servo-motor L and accompanying connections such as the arm Q will be omitted. In place of this servo mechanism, the small auxiliary servo mechanism shown in Figure 8 will be provided for causing precession of the rotor about a horizontal transverse axis. The auxiliary servo mechanism comprises an auxiliary fork T mounted with its limbs horizontal above and below the axial pin E of the rotor. The fork is carried on one arm of a bell crank T¹ pivoted about a horizontal axis parallel to that of the rotor and having an arm T² carrying a balance weight T³. Alternatively, the fork may be mounted on a parallel linkage like the main fork. The other arm T⁴ of the bell crank T¹ is connected to a small light piston valve U which operates the auxiliary servo-motor. The valve U has an appreciable lap so that it is not operated by small up and down movements of the axial pin of the rotor but is operated as soon as these movements exceed a certain value.

The auxiliary servo-motor comprises a double-acting piston V which is normally centered by means of a pair of helical springs V¹ and V². At one end the piston rod carries a pair of parallel leaf springs V³ and V⁴ which project laterally from the piston rod, one on either side of a pin W which projects from the side link H² of the parallel linkage supporting the main fork H. The two leaf springs V³ and V⁴ are far enough apart to permit the parallel linkage to perform its normal movements without engaging either of them. When, however, the auxiliary servo mechanism is operated, the piston V is moved longitudinally such a distance that one of the leaf springs presses on the pin W and tends to shift the main fork to one side or the other. The direction of pressure is such as to cause precession of the gyro rotor to bring its axis into line with that of the spindle.

Where the rudder only is controlled, it will of course be appreciated that no provision need be made for mounting the rotor casing C so as to be capable of tilting about a horizontal axis in the cradle B. The rotor casing may be mounted direct on the base plate so as to be capable of swinging about a vertical axis.

It will be appreciated that for operating any one given control, the apparatus may be situated with the rotor axis in any direction in a plane at right angles to the axis of control.

For example, for operating the rudder, the axis of control will be vertical and the rotor axis may be fore and aft or athwart the craft or in any other horizontal direction. Similarly, for elevator control the rotor axis may be fore and aft or vertical or between the two, while for aileron control it may be vertical or athwart or between the two. In each case the auxiliary control will operate about an axis at right angles both to the axis of control and to the rotor axis.

Where two navigating controls are to be operated, it will be appreciated that for operating the elevators and rudder the rotor axis will be fore and aft, for operating the elevators and aileron the rotor axis will be vertical and for operating the rudder and aileron the rotor axis will be athwart the craft.

It will be appreciated that various modifications may be made to the arrangements described without departing from the invention. For example, where the means for causing precession of the rotor are under automatic control, they may operate through an auxiliary servo mechanism similar to that shown in Figure 8 but operated by the device in question instead of by the bell crank T¹ and fork T.

The particular arrangement for connecting the mechanism to the controls of the air craft has the advantage of simplicity and owing to the very compact assembly rendered possible by the invention, the mechanism can in the great majority of cases be fitted in a position between the pilot's legs and forwardly of the joy-stick or control column of the aircraft. Thus the mechanism can be made of substantially standard size since the rudder controls and joy-stick will normally be spaced to suit the average pilot. At the same time it will be appreciated that the invention is not limited to this arrangement as other arrangements may be employed, for example, arrangements employing dummy rudder bars connected by wires to suitable parts on the aircraft.

Moreover the apparatus may be employed for operating controls other than navigating controls for example for maintaining constant the orientation of supports such as those of guns or searchlights, bombing sights, directional wireless aerials and the like. For greater accuracy two or more devices may be employed, one serving to maintain in substantially constant orientation the support of the next which can therefore operate correspondingly more accurately. Moreover the invention is not limited to controlling apparatus since it may be advantageously employed when the purpose is simply to use the follow-up movement of the spindle to maintain accuracy of orientation of the rotor merely for purposes of indication. Again, the invention may be applied to apparatus for controlling other factors than the deviation, for example for preventing the firing of a gun at all times except when a turret is in a particular orientation.

What I claim as my invention and desire to secure by Letters Patent is:—

1. Gyroscopic apparatus comprising in combination a support, a driving spindle rotatably carried thereby, and a gyro rotor, cooperating part-spherical surfaces afforded respectively by the spindle and rotor with their centres of curvature substantially on the axis of rotation and the centre of balance of the rotor whereby the rotor is carried and driven by the spindle, and servo means operatively connected to the rotor and spindle so as to be controlled by movement of the rotor axis relative to the spindle about an axis of control at right angles to the spindle axis, to impart to the spindle a follow-up movement relatively to its support about the said axis of control to restore the spindle axis to a plane containing the rotor axis and the said axis of control.

2. Gyroscopic apparatus comprising in combination a support, a driving spindle rotatably carried thereby, and a gyro rotor, cooperating part-spherical surfaces afforded respectively by the spindle and rotor with their centres of curvature substantially on the axis of rotation and the centre of balance of the rotor whereby the rotor is carried and driven by the spindle, and servo means operatively connected to the rotor and spindle so as to be controlled by movement of the rotor axis relative to the spindle about each of two mutually perpendicular control axes each at right angles to the spindle axis, and so as each to impart to the spindle a follow-up movement relatively to its support about the respective axis of control to restore the spindle axis to a plane containing the rotor axis and the said axis of control, the two servo devices thereby together bringing the spindle axis into alignment with the rotor axis.

3. Automatic navigating apparatus for air or other craft including a support, a driving spindle rotatably carried thereby, and a gyro rotor, cooperating part-spherical surfaces afforded respectively by the spindle and rotor with their centres of curvature substantially on the axis of rotation and the centre of balance of the rotor whereby the rotor is carried and driven by the spindle, servo means operatively connected to the rotor and spindle so as to be controlled by movement of the rotor axis relative to the spindle about an axis of control at right angles to the spindle axis to impart to the spindle a follow-up movement relatively to its support about the said axis of control to restore the spindle axis to a plane containing the rotor axis and the said axis of control, and means for connecting the servo means to navigating controls to operate them and effect the navigation of craft about the said axis of control.

4. Automatic navigating apparatus for air or other craft including a support, a driving spindle rotatably carried thereby, and a gyro rotor, cooperating part-spherical surfaces afforded respectively by the spindle and rotor with their centres of curvature substantially on the axis of rotation and the centre of balance of the rotor whereby the rotor is carried and driven by the spindle, servo means operatively connected to the rotor and spindle so as to be controlled by movement of the rotor axis relative to the spindle about each of two mutually perpendicular control axes each at right angles to the spindle axis, and so as each to impart to the spindle a follow-up movement relatively to its support about the respective axis of control to restore the spindle axis to a plane containing the rotor axis and the said axis of control, the two servo devices thereby together bringing the spindle axis into alignment with the rotor axis, and means for connecting the servo means to navigating controls to operate them and effect the navigation of craft about each of the said axes of control.

5. Gyroscopic apparatus comprising in combination a support, a driving spindle rotatably carried thereby, and a gyro rotor, cooperating part-spherical surfaces afforded respectively by the spindle and rotor with their centres of curvature substantially on the axis of rotation and the centre of balance of the rotor whereby the rotor is carried and driven by the spindle, a pin extending coaxially from the rotor, a fork having its limbs extending on opposite sides of the said pin and servo means operatively connected to said fork so as to be controlled by movement of the rotor axis relative to the spindle about an axis of control at right angles to the spindle axis, and operatively connected to the spindle so as to impart thereto a follow-up movement relatively to its support about the said axis of control to restore the spindle axis to a plane containing the rotor axis and the said axis of control.

6. Gyroscopic apparatus comprising in combination a support, a driving spindle rotatably carried thereby, and a gyro rotor, cooperating part-spherical surfaces afforded respectively by the spindle and rotor with their centres of curvature substantially on the axis of rotation and the centre of balance of the rotor whereby the rotor is carried and driven by the spindle, a pin extending coaxially from the rotor, a fork having its limbs extending on opposite sides of the said pin and so spaced as both to press lightly upon opposite sides of the pin, and servo means operatively connected to said fork so as to be controlled by movement of the rotor axis relative to the spindle about an axis of control at right angles to the spindle axis, and operatively connected to the spindle so as to impart thereto a follow-up movement relatively to its support about the said axis of control to restore the spindle axis to a plane containing the rotor axis and the said axis of control.

7. Gyroscopic apparatus comprising in combination a support, a driving spindle rotatably carried thereby, and a gyro rotor, cooperating part-spherical surfaces afforded respectively by the spindle and rotor with their centres of curvature substantially on the axis of rotation and the centre of balance of the rotor whereby the rotor is carried and driven by the spindle, a pin extending coaxially from the rotor, a fork mounted with its limbs extending on opposite sides of said pin on a parallel linkage so that the limbs of the fork remain parallel to a fixed direction as the fork moves laterally, and servo means operatively connected to said fork so as to be controlled by movement of the rotor axis relative to the spindle about an axis of control at right angles to the spindle axis, and operatively connected to the spindle so as to impart thereto a follow-up movement relatively to its support about the said axis of control to restore the spindle axis to a plane containing the rotor axis and the said axis of control.

8. Gyroscopic apparatus comprising in combination a support, a driving spindle rotatably carried thereby, and a gyro rotor, cooperating part-spherical surfaces afforded respectively by the spindle and rotor with their centres of curvature substantially on the axis of rotation and the centre of balance of the rotor whereby the rotor is carried and driven by the spindle, a pin extending coaxially from the rotor, a fork having its limbs extending on opposite sides of the said pin pivotally mounted so as to be capable of moving laterally and also of turning about an axis parallel to the lengths of its limbs to prevent jamming, and servo means operatively connected to said fork so as to be controlled by movement of the rotor axis relative to the spindle about an axis of control at right angles to the spindle axis, and operatively connected to the spindle so as to impart thereto a follow-up movement relatively to its support about the said axis of control to restore the spindle axis to a plane containing the rotor axis and the said axis of control.

9. Gyroscopic apparatus comprising in combination a support, a driving spindle rotatably carried thereby, and a gyro rotor, cooperating part-spherical surfaces afforded respectively by the spindle and rotor with their centres of curvature substantially on the axis of rotation and the centre of balance of the rotor whereby the rotor is carried and driven by the spindle, and fluid-operated servo means operatively connected to the spindle and comprising a piston valve of which the movable member is provided with gear teeth meshing with a pinion by which it is continuously rotated so that the rotational movement between the piston and the walls of its casing and the sliding movement between the cooperating gear teeth reduce the frictional resistance to longitudinal movement, said valve being operatively connected to the rotor so that the servo means is controlled by movement of the rotor axis relative to the spindle about an axis of control at right angles to the spindle axis to impart to the spindle a follow-up movement relatively to its support about the said axis of control to restore the spindle axis to a plane containing the rotor axis and the said axis of control.

10. Gyroscopic apparatus comprising in combination a support, a driving spindle rotatably carried thereby, and a gyro rotor, cooperating part-spherical surfaces afforded respectively by the spindle and rotor with their centres of curvature substantially on the axis of rotation and the centre of balance of the rotor whereby the rotor is carried and driven by the spindle and fluid-operated servo means operatively connected to the spindle and comprising a pair of parallel piston valves connected to opposite ends of a pivoted lever so as to balance one another, said valves being operatively connected to the rotor so that the servo means is controlled by the movement of the rotor axis relative to the spindle about an axis of control at right angles to the spindle axis to impart to the spindle a follow-up movement relatively to its support about the said axis of control to restore the spindle axis to a plane containing the rotor axis and the said axis of control.

11. Gyroscopic apparatus comprising in combination a support, a driving spindle rotatably carried thereby, and a gyro rotor, cooperating part-spherical surfaces afforded respectively by the spindle and rotor with their centres of curvature substantially on the axis of rotation and the centre of balance of the rotor whereby the rotor is carried and driven by the spindle, and fluid-operated servo means operatively connected to the rotor and spindle so as to be controlled by movement of the rotor axis relative to the spindle about an axis of control at right angles to the spindle axis to impart to the spindle a follow-up movement relatively to its support about the said axis of control to restore the spindle axis to a plane containing the rotor axis and the said axis of control, the servo means including a controlling valve comprising moving parts so connected and arranged that they can be caused to move by the rotor and normally stationary parts which are however movable for purposes of adjustment.

12. Gyroscopic apparatus comprising in combination a support, a driving spindle rotatably carried thereby, and a gyro rotor, cooperating part-spherical surfaces afforded respectively by the spindle and rotor with their centres of curvature substantially on the axis of rotation and the centre of balance of the rotor whereby the rotor is carried and driven by the spindle, and servo means operatively connected to the rotor and spindle so as to be controlled by movement of the rotor axis relative to the spindle about an axis of control at right angles to the spindle axis to impart to the spindle a follow-up movement relatively to its support about the said axis of control to restore the spindle axis to a plane containing the rotor axis and the said axis of control, and means for causing precession of the rotor about the said axis of control to adjust the orientation of the rotor.

13. Automatic navigating apparatus for air or other craft including a support, a horizontal driving spindle rotatably carried thereby, and a gyro rotor, cooperating part-spherical surfaces afforded respectively by the spindle and rotor with their centres of curvature substantially on the axis of rotation and the centre of balance of the rotor whereby the rotor is carried and driven by the spindle, and servo means operatively connected to rudder controls and to the rotor and spindle so as to be controlled by movement of the rotor axis relative to the spindle about a vertical axis of control to impart to the spindle a follow-up movement relatively to its support about the said axis of control to restore the spindle axis to a plane containing the rotor axis and the said axis of control, and means adapted to be controlled by a compass for causing precession of the rotor about the axis of control to adjust the orientation of the rotor.

14. Automatic navigating apparatus for air or other craft including a support, a driving spindle rotatably carried thereby, and a gyro rotor, cooperating part-spherical surfaces afforded respectively by the spindle and rotor with their centres of curvature substantially on the axis of rotation and the centre of balance of the rotor whereby the rotor is carried and driven by the spindle, and servo means operatively connected to navigating controls and to the rotor and spindle so as to be controlled by movement of the rotor axis relative to the spindle about an axis of control at right angles to the spindle axis to impart to the spindle a follow-up movement relatively to its support about the said axis of control to restore the spindle axis to a plane containing the rotor axis and the said axis of control, and means adapted to be controlled by external electric controlling means for causing precession of the rotor about the axis of control to adjust the orientation of the rotor.

15. Automatic navigating apparatus for air or other craft including a support, a driving spindle rotatably carried thereby with its axis in a vertical fore and aft plane, and a gyro rotor, cooperating part-spherical surfaces afforded respectively by the spindle and rotor with their centres of curvature substantially on the axis of rotation and the centre of balance of the rotor whereby the rotor is carried and driven by the spindle, and servo means operatively connected to elevator controls and to the rotor and spindle so as to be controlled by movement of the rotor axis relative to the spindle about a horizontal transverse axis of control to impart to the spindle a follow-up movement relatively to its support about the said axis of control to restore the spindle axis to a plane containing the rotor axis and the said axis of control, and means adapted to be controlled by a manometric pressure-actuated device for causing precession of the rotor about the axis of control to adjust the orientation of the rotor.

16. Automatic navigating apparatus for air or other craft including a support, a driving spindle rotatably carried thereby, and a gyro rotor, cooperating part-spherical surfaces afforded respectively by the spindle and rotor with their centres of curvature substantially on the axis of rotation and the centre of balance of the rotor whereby the rotor is carried and driven by the spindle, and fluid-operated servo means operatively connected to the rotor and spindle so as to be controlled by movement of the rotor axis relative to the spindle about an axis of control at right angles to the spindle axis to impart to the spindle a follow-up movement relatively to its support about the said axis of control to restore the spindle axis to a plane containing the rotor axis and the said axis of control, and means for connecting the servo means to navigating controls to operate them and effect the navigation of craft about the axis of control, wherein the servo means comprise a double-acting hydraulic cylinder and a valve operable at will to place the two ends of the cylinder in communication so as to enable the navigating controls to be operated manually.

17. Gyroscopic apparatus comprising in combination a support, a driving spindle rotatably carried thereby, and a gyro rotor, cooperating part-spherical surfaces afforded respectively by the spindle and rotor with their centres of curvature substantially on the axis of rotation and the centre of balance of the rotor whereby the rotor is carried and driven by the spindle, and servo means operatively connected to the rotor and spindle so as to be controlled by movement of the rotor axis relative to the spindle about an axis of control at right angles to the spindle axis to impart to the spindle a follow-up movement relatively to its support about the said axis of control to restore the spindle axis to a plane containing the rotor axis and the said axis of control, and means for automatically limiting the movement of the rotor relative to the spindle about an axis perpendicular to that control axis comprising means operated by such movement in excess of certain limits to press the rotor about the axis of control and thereby cause a precession of the rotor about the said axis perpendicular thereto towards alignment with the spindle.

18. Gyroscopic apparatus comprising in combination a support, a driving spindle rotatably carried thereby, and a gyro rotor, cooperating part-spherical surfaces afforded respectively by the spindle and rotor with their centres of curvature substantially on the axis of rotation and the centre of balance of the rotor whereby the rotor is carried and driven by the spindle, a pin extending coaxially from the rotor, a fork having its limbs extending on opposite sides of the said pin and servo means operatively connected to said fork so as to be controlled by movement of the rotor axis relative to the spindle about an axis of control at right angles to the spindle axis, and operatively connected to the spindle so as to impart thereto a follow-up movement relatively to its support about the said axis of control to restore the spindle axis to a plane containing the rotor axis and the said axis of control, and means for automatically limiting the movement of the rotor relative to the craft about an axis perpendicular to that control axis comprising an auxiliary fork member perpendicular to the main fork member and arranged so that when the auxiliary fork member is moved laterally by the pin projecting axially from the rotor between its limbs, the main fork is urged laterally in the appropriate direction.

19. Gyroscopic apparatus comprising in combination a support, a driving spindle rotatably carried thereby, and a gyro rotor, cooperating part-spherical surfaces afforded respectively by the spindle and rotor with their centres of curvature substantially on the axis of rotation and the centre of balance of the rotor whereby the rotor is carried and driven by the spindle, a pin extending coaxially from the rotor, a fork having its limbs extending on opposite sides of the said pin and servo means operatively connected to said fork so as to be controlled by movement of the rotor axis relative to the spindle about an axis of control at right angles to the spindle axis, and operatively connected to the spindle so as to impart thereto a follow-up movement relatively to its support about the said axis of control to restore the spindle axis to a plane containing the rotor axis and the said axis of control, and means for automatically limiting the movement of the rotor relative to the craft about an axis perpendicular to that control axis comprising an auxiliary fork member perpendicular to the main fork member and also embracing the pin, servo means operatively connected to said auxiliary fork so as to be controlled by lateral movement thereof and arranged to urge the main fork laterally and thereby cause a precession of the rotor about the said axis perpendicular to the control axis.

20. Gyroscopic apparatus comprising in combination a support, a driving spindle rotatably carried thereby, and a gyro rotor, cooperating part-spherical surfaces afforded respectively by the spindle and rotor with their centres of curvature substantially on the axis of rotation and the centre of balance of the rotor whereby the rotor is carried and driven by the spindle, and liquid-operated servo means operatively connected to the rotor and spindle so as to be controlled by movement of the rotor axis relative to the spindle about an axis of control at right angles to the spindle axis to impart to the spindle a follow-up movement relatively to its support about the said axis of control to restore the spindle axis to a plane containing the rotor axis and the said axis of control.

21. Gyroscopic apparatus comprising in combination a support, a driving spindle rotatably carried thereby, and a gyro rotor, cooperating part-spherical surfaces afforded respectively by the spindle and rotor with their centres of curvature substantially on the axis of rotation and the centre of balance of the rotor whereby the rotor is carried and driven by the spindle, a pin extending coaxially from the rotor, a fork having its limbs extending on opposite sides of the said pin, servo means operatively connected to said fork so as to be controlled by movement of the rotor axis relative to the spindle about an axis of control at right angles to the spindle axis and connected to the spindle so as to impart thereto a follow-up movement relatively to its support about the said axis of control to restore the spindle axis to a plane containing the rotor axis and the said axis of control, and a weight mounted on the rotor so as to be movable along the axis thereof to adjust its balance.

22. Gyroscopic apparatus comprising in combination a support, a driving spindle rotatably carried thereby, and a gyro rotor built up from a rim and a web formed separately, cooperating part-spherical surfaces afforded respectively by the spindle and rotor with their centres of curvature substantially on the axis of rotation and the centre of balance of the rotor whereby the rotor is carried and driven by the spindle, and fluid-operated servo means comprising piston valves operatively connected to the rotor and spindle so as to be controlled by movement of the rotor axis relative to the spindle about an axis of control at right angles to the spindle axis to impart to the spindle a follow-up movement relatively to its support about the said axis of control to restore the spindle axis to a plane containing the rotor axis and the said axis of control.

23. Gyroscopic apparatus comprising in combination a support, a driving spindle rotatably carried thereby, and a gyro rotor, cooperating part-spherical surfaces afforded respectively by the spindle and rotor with their centres of curvature substantially on the axis of rotation and the centre of balance of the rotor whereby the rotor is carried and driven by the spindle, fluid-operated servo means operatively connected to the spindle and comprising a pair of parallel piston valves connected to opposite ends of a pivoted lever so as to balance one another said valves being operatively connected to the rotor so that the servo means is controlled by the movement of the rotor axis relative to the spindle about an axis of control at right angles to the spindle axis to impart to the spindle a follow-up movement relatively to its support about the said axis of control to restore the spindle axis to a plane containing the rotor axis and the said axis of control, and at least one adjustable weight carried by the valves for adjusting their balance.

24. Automatic navigating apparatus for aircraft adapted to be placed between a pilot's legs forwardly of the control column or "joy stick" and to be connected to the latter and to the rudder bar, said apparatus including a support, a driving spindle rotatably carried thereby, and a gyro rotor, cooperating part-spherical surfaces afforded respectively by the spindle and rotor with their centres of curvature substantially on the axis of rotation and the centre of balance of the rotor whereby the rotor is carried and driven by the spindle, servo means operatively connected to the rotor and spindle so as to be controlled by movement of the rotor axis relative to the spindle about each of two mutually perpendicular control axes each at right angles to the spindle axis, and so as each to impart to the spindle a follow-up movement relatively to this support about the respective axis of control to restore the spindle axis to a plane containing the rotor axis and the said axis of control, the two servo devices thereby together bringing the spindle axis into alignment with the rotor axis, and means for connecting the servo means to the joy stick and the rudder bar to operate them and effect the navigation of craft about the axes of control.

25. Gyroscopic apparatus comprising in combination a support, a gyro rotor mounted thereon adapted to be movable relatively thereto about an axis of control perpendicular to its axis of rotation, a pin fixed to and extending coaxially from the rotor and adapted to rotate therewith, a fork mounted so as to be laterally movable and having its limbs extending generally parallel to the said axis of control on opposite sides of the said pin, and servo means operatively connected to said fork so as to be controlled by movement of the rotor axis relative to the support about the said axis of control.

26. Automatic navigating apparatus for air or other craft, comprising a support, a gyro rotor carried thereby adapted to be movable relatively thereto about axes perpendicular to its axis of rotation, servo means operatively connected to the gyro rotor so as to be controlled by such movement about one axis, means for operatively connecting the servo means to an appropriate navigating control, and means for automatically limiting the movement of the rotor relative to the spindle about an axis perpendicular to that control axis comprising means operated by such movement in excess of certain limits to press the rotor about the axis of control and thereby cause a precession of the rotor about the said axis perpendicular thereto towards alignment with the spindle.

27. Gyroscopic apparatus comprising in combination a support, a gyro rotor mounted thereon adapted to be movable relatively thereto about an axis of control perpendicular to its axis of rotation, a pin extending substantially coaxially from the rotor and adapted to rotate therewith, a fork mounted so as to be laterally movable and having its limbs extending generally parallel to the said axis of control on opposite sides of the said pin, and servo means operatively connected to said fork so as to be controlled by movement of the rotor axis relative to the support about the said axis of control, the said pin being very slightly eccentric with respect to the rotor axis so as to maintain the controlling part of the servo means continually shivering and prevent sticking.

28. Gyroscopic apparatus comprising, in combination, a support, a gyro rotor mounted thereon adapted to be movable relatively thereto about an axis of control perpendicular to its axis of rotation, a pin fixed to and extending coaxially from the rotor and adapted to rotate therewith, a fork mounted so as to be laterally movable and having its limbs extending generally parallel to the said axis of control on opposite sides of the said pin, and liquid-operated servo means operatively connected to said fork so as to be controlled by movement of the rotor axis relative to the support about the said axis of control.

29. Gyroscopic apparatus comprising, in combination, a support, a gyro rotor mounted thereon adapted to be movable relatively thereto about an axis of control perpendicular to its axis of rotation, a pin extending substantially coaxially from the rotor and adapted to rotate therewith, a fork mounted so as to be laterally movable and having its limbs extending generally parallel to the said axis of control on opposite sides of the said pin, and liquid-operated servo means operatively connected to said fork so as to be controlled by movement of the rotor axis relative to the support about the said axis of control, the said pin being very slightly eccentric with respect to the rotor axis so as to maintain the controlling part of the servo means continually shivering and prevent sticking.

JOHN POLLOCK BROWN.